(12) United States Patent
Aborn

(10) Patent No.: X7070
(45) Date of Patent: May 19, 1832

(54) CANDLES, DIPPING MACHINE

(76) Inventor: John Aborn

John Aborn of Trenton State of New Jersey

Letters Patent

The schedule referred to in these Letters Patent and making part
of the same, containing a description in the words of the said John
Aborn himself of his improvement in the machine for dipping candles
Be it known, that I John Aborn of Trenton, State of New
Jersey have made an improvement in the Machine for dipping candles
which is described as follows -

1) the frame with the railways - The frame is made of any conve-
nient length or width and height, for this purpose a number of uprights
are placed forming a parallelogram connected together with cross bars
At about five feet from the Floor a railway is placed on each side
and at about 18 inches above this railway is placed another railway - At
each end of the frame are placed uprights having ironrails on them
inside for receiving the sliding frames to be hereafter described 2. The carriages on which the candles are conveyed.
These are made in length equal to the width of the frame which
will generally be about 6 feet and about 2 or 3 feet wide - They will be
made to run in the grooves or railways upon wheels, rollers or slides
upon these carriages the rods with the wicks are placed -

3' The slides with their catches and Windlasses - Two slides
are fixed with windlasses catches, one on the upper tier of carriages
the other on the lower tier for drawing the carriages out of the sliding
frames - At each end of these slides are attached cords running
over pulleys or wheels and drawn by windlasses - They are run
back by means of weights and cords running over similar wheels
or pulleys to receive the next carriage -

4th. The ~~next~~ balance beam with the sliding frames to receive the
carriages and lever for hoisting and weighing the candles -
The balance beam is made the whole length of the frame and is sus-
pended & works on two posts by a beam turning on pivots in
sockets - The sliding frames are attached one at each end of the beam by ropes or chains, and slide up and down on the iron rods before mentioned on the posts .. A lever turning on a pin secured in the main frame is attached by a cord or chain to the sliding frame: and when it is required to weigh the candles on the sliding frame, a prop by means of a cord is raised under the balance beam which takes the weight of it and throws it on the lever, by which the candles are weighed as by a steelyard - . 5th. The frame for wicking - Underneath the railways and near the dipper stands the wicking frame with a hook to catch the bars and hold them fast: The bars have hooks the whole length to hold the wicks: and which are suspended from the rods on the carriages above - The bars holding the wicks must be sufficiently heavy to sink the wicks in the tallow. 6th. The Vat for holding the tallow - This is constructed by making a box of wood water tight about [illegible] inches deep and the length of the width of the frame; inside of this is placed a copper vessel about 2 inches from the bottom and one inch from the sides so as to admit the steam to circulate freely around the sides and bottom of the copper vessel - The tallow is put into this copper vessel to be dipped — 7th. The boiler & reservoir — The Boiler is made of copper or any suitable material - The stove is made of a cylindrical shape and the boiler is let into it running into the stove about 3 feet, and projecting above it about 1 foot - allowing about 1/2 inch for the heat to circulate round the boiler. Pipes conveying steam issue from the boiler to the reservoir and vat to melt the tallow and prevent that which is in the Vat getting cold - The reservoir is round and made like the vat with a copper vessel inside to hold the tallow to be melted -

A pipe leads from this to the Vat, conveying the melted tallow

Operation

The tallow to be melted is put into the reservoir, the steam is raised in the Boiler and conveyed to the bottom of the reservoir: this melts the tallow which is then conveyed into the Vat. The wicks are put upon the bars on the wicking frame, and attached to the rods on the carriages above, the carriages are conveyed by the windlass and slides to the dipping frame, the wicks are then dipped by means of the lever attached to the sliding or dipping frame, they are then raised by this lever and the bars removed: the wicks are then cut apart by a knife for that purpose the carriages are then drawn out by the windlass and made to slide along the upper railway till they arrive at the further end of the machine when the upper frames descend to the lower railways and proceed forward to the Vat, and are received again on the dipping frame and again dipped, and so on till the candles are made of a sufficient size—

When it is required to weigh the candles the prop is raised under the balance beam, which takes off the weight and throws it on the lever, by which the weight is ascertained as with a steelyard and if the candles are found to be too light the dipping is continued till they are of sufficient weight—

What I claim as my invention, and desire to secure by Letters Patent is the before described machine for dipping candles particularly by the railways, the balance beam, the carriages, the sliding frames, the slides with catches, the wicking frame and the lever for hoisting and weighing—

For a further illustration of my invention I refer to the Model and drawing deposited in the Patent office In testimony whereof I have hereunto subscribed my name this 22d day of March 1832

Witnesses
Willm C. Howell
Wm P. Elliott

John Ahorn

[illegible]

[illegible]